Patented June 14, 1927.

1,632,546

UNITED STATES PATENT OFFICE.

J BIRCHARD GREEN, OF CHICAGO, ILLINOIS, ASSIGNOR TO FUSION WELDING CORPORATION, OF CHICAGO, ILLINOIS, A CORPORATION OF ILLINOIS.

WELDING ROD.

No Drawing.   Application filed September 20, 1926. Serial No. 136,725.

My invention, which is of particular importance in connection with the manufacture of welding rods, resides in the discovery of a heretofore unrecognized, but actively sought for and highly important factor which I have found to be responsible in large measure for the lack of uniformity obtained in the operating characteristics and weld properties given by different ferrous metal welding rods having the same chemical composition and the same carbon content.

As is known, when carbon is combined with iron or other ferrous metal, such as manganese, the resulting carbide assumes either what is known as a perlitic form, in which it exists in extremely thin laminar plates separated by ferrite, or what is known as a globular or massive form, in which it has less surface area. In any particular piece of metal containing carbon, the carbide may be all in perlitic form, all in globular form, or partly in perlitic and partly in globular form, either mixed or localized. The form in which the carbon is present depends upon the manner in which the metal with the carbon therein is produced and worked.

Heretofore it has been supposed that the operating characteristics and weld properties given by welding rods are dependent upon the composition of the rod, and upon the composition and proportioning of the flux coating when such a coating is used; and the lack of uniformity in the action and results obtained has been attributed to variations in composition and operating conditions.

I have discovered, however, that while the composition of the rod and the composition and proportioning of the flux coating are of considerable importance, uniformity of action in welding with a rod of ferrous metal containing carbide can only be obtained, other factors and conditions being uniform, when some part or all of the carbide in the metal exists in globular as distinguished from perlitic form. Such factor, in so far as the art of welding is concerned, has heretofore received no attention, as there is nothing in the different forms of the carbide to indicate that the same might have any influence on the results obtained in welding.

In both the electric arc and gas torch processes of fusion welding, carbon is burned out of the welding rod by the action of the air to a marked degree and, during such burning, the incident chemical reaction causes a commotion of the metal in the fusion zone which interferes with the smooth flow of the rod into the weld.

My experiments have demonstrated conclusively that when the carbide in the ferrous metal of the rod is in globular form, the rod will flow more smoothly in fusion welding than another rod possessing the same carbide content but in which the carbide is present in perlitic as distinguished from globular form. This may be due to the fact that the greater surface area of the carbide when in perlitic form offers a proportionally greater air contact during the flow of the metal. The differences in the uniformity of results are especially noticeable when the rod is used as a metallic arc electrode. The carbide, when present in an electrode in perlitic form, causes the arc to flit around, and, when present in globular form, causes it to concentrate and become readily manageable. I have found that the greater the percentage of the total carbide which is present in globular form, the steadier the arc.

I claim:

1. A welding rod or wire of ferrous metal containing carbide, the major portion of which carbide is in globular form.

2. A welding rod or wire of ferrous metal containing carbide, the major portion of which carbide in any localized part of the cross section is in globular form.

3. A welding rod or wire of ferrous metal containing carbide, the major portion of which carbide in the localized portion of the rod or wire most apt to result in air contact is in globular form.

In testimony whereof I have hereunto subscribed my name.

J BIRCHARD GREEN.